United States Patent [19]

Sandstrom et al.

US005534599A

[11] Patent Number: 5,534,599
[45] Date of Patent: Jul. 9, 1996

[54] TIRE WITH SILICA REINFORCED RUBBER TREAD

[75] Inventors: Paul H. Sandstrom, Tallmadge; David J. Zanzig, Uniontown; Mark S. Sinsky, Akron, all of Ohio

[73] Assignee: The Goodyear Tire & Rubber Company, Akron, Ohio

[21] Appl. No.: 402,427

[22] Filed: Mar. 10, 1995

[51] Int. Cl.$^6$ .............................. C08C 19/25; B60C 5/00
[52] U.S. Cl. ............................................ 525/342; 152/450

[58] Field of Search ............................... 152/450; 525/342

*Primary Examiner*—Christopher A. Henderson, Jr.
*Attorney, Agent, or Firm*—Henry C. Young, Jr.

[57] ABSTRACT

A rubber composition comprised of elastomer, silica, a silica coupler, sulfur and, optionally, carbon black, in which the silica, silica coupler and at least a portion of the sulfur are added in a non-productive mix stage.

Pneumatic tires having treads comprised of such rubber composition are provided.

1 Claim, No Drawings

TIRE WITH SILICA REINFORCED RUBBER TREAD

FIELD

This invention relates to rubber compositions which contain silica reinforcement which uses a silica coupling agent and particularly to a method of preparation thereof.

The invention also relates to a tire having a tread of such composition, including a method of preparation thereof.

BACKGROUND

For various applications utilizing rubber which requires high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires.

Carbon black is often considered a more effective reinforcing filler for rubber products, and particularly for rubber tire treads than silica if the silica is used without a coupling agent, or silica coupler as it may be sometimes referred to herein.

Various materials have been used as silica couplers, sometimes also known as coupling agents or adhesives, to overcome such deficiencies of silica for a purpose of reinforcing rubber compositions. Generally such silica couplers are compounds having a capability of reacting with both the silica surface and with a sulfur vulcanizable rubber elastomer molecule. A sulfur vulcanizable rubber is normally considered an elastomer which contains carbon-to-carbon unsaturation which will conventionally undergo sulfur vulcanization because of such unsaturation, normally through a carbon atom adjacent to a carbon atom which is double bonded to another carbon atom. It is believed that such vulcanization is well known to those skilled in such art.

The silica coupling agents may, for example, sometimes be premixed, or pre-reacted, with the silica particles or added to the rubber mix during the rubber/silica processing, or mixing, stage. If the coupling agent and silica are added separately to the rubber mix during the rubber/silica processing, or mixing, stage, it is considered that the coupling agent then combines in situ with the silica and with the rubber.

In one aspect, such coupling agents may be composed of an organosilane polysulfide which has a constituent component, or moiety, (the silane portion) capable of reacting with the silica surface and, also, a constituent component, or moiety, (the polysulfide portion) capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In another aspect, the silane of the coupling agent apparently forms a bond to the silica surface, rather quickly during the rubber/silica mixing process and the rubber reactive component of the coupling agent combines with the rubber at a much slower rate. The rubber reactive component of the coupler is generally temperature sensitive and tends to combine with the rubber rather slowly during the rubber mixing steps and more completely during the higher temperature sulfur vulcanization stage.

An example of such coupling agents for use in combining silica and rubber, is, for example, an organosilane polysulfide such as bis-(3-trialkoxyxysilylalkyl)polysulfide where the sulfide bridge contains 2 to 8 connecting sulfur atoms in which the average polysulfide bridge contains about 4.5 to about 5.5 sulfur atoms so that the polysulfide may be more generally referred to as a tetrasulfide and, further, in which not more than 25 percent of the polysulfide bridge portion contains 2 or less sulfur atoms. In other words, such polysulfide predominately normally contains 3 or more connecting sulfur atoms in its polysulfide bridge portion. An example of such commercially available silica coupler is Si69 manufactured by the Degussa AG company.

Various, although not exhaustive, patents relating to silicas and silica reinforced tire treads include U.S. Pat. Nos. 3,451,458; 3,664,403; 3,768,537; 3,884,285; 3,938,574; 4,482,663; 4,590,052; 5,089,554 and British 1,424,503.

U.S. Pat. No. 4,513,123 discloses a rubber composition containing dithiodipropionic acid with natural rubber, or blends of natural and synthetic rubbers, 30–80 parts carbon black, sulfur and organo-cobalt compound for use as skim stock for brass-plated steel. It relates that the rubber composition can contain other additives such as fillers such as clays, silicas or calcium carbonate, process and extender oils, antioxidants, cure accelerators, cure activators, cure stabilizers and the like.

In sulfur curable rubber compositions, the ingredients are conventionally blended in several stages, referred to as "non-productive mix stage or stages" followed by a final "productive mix stage" in which curatives such as sulfur and cure accelerators are added. The non-productive mix stage or stages, which are conventionally 1 or 2 to 4 sequential mix stages, are typically conducted at temperatures in a range of about 140° C. to 190° C. and the productive mix stage may conventionally be conducted at temperatures in a range of about 100° C. to 130° C. The aforesaid curatives are conventionally only added in the final, lower temperature, mix stage to keep the rubber from prematurely curing at the aforesaid elevated mix temperatures of the non-productive mix stages.

While, conceivably, sulfur might be added in a non-productive stage, the inventors are not aware of any circumstance where, prior to their invention, sulfur had been added to a rubber/silica/silica coupler blend in a non-productive mix stage prior to a productive mix stage where sulfur would normally be added.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to rubber which has been blended or mixed with various ingredients and materials and such terms are well known to those having skill in the rubber mixing or rubber compounding art.

SUMMARY AND PRACTICE OF THE INVENTION

In accordance with this invention, a rubber composition is prepared by a process which comprises the sequential steps of:

(A) thermomechanically mixing in at least one individual preparatory mixing step, at a temperature in a range of about 140° C. to about 190° C. for a total mixing time of about 4 to about 20, alternatively about 4 to about 12, minutes;
  (i) 100 parts by weight of at least one sulfur vulcanizable elastomer selected from conjugated diene homopolymers and copolymers and from copolymers of at least one conjugated diene and aromatic vinyl compound,
  (ii) about 15 to about 100 phr of particulate precipitated silica,
  (iii) about 0.01 to about 0.2 parts by weight per part by weight of said silica of a bis-(3-trialkoxyxysilylalkyl)polysulfide where the sulfide bridge portion contains 2 to about 8 connecting sulfur atoms in which the average polysulfide bridge contains about 4.5 to about 5.5 sulfur atoms and in which at least 75 percent of the polysulfide bridge portion contains at least 3 sulfur atoms, and
  (iv) about 0.01 to about one part by weight of at least one of elemental sulfur and polymeric sulfur per part by weight of silane coupling agent;
(B) subsequently blending therewith in a final, individual thermomechanical mixing step at a temperature in a range of about 100° C. to about 130° C. for a time of about 1 to about 3 minutes, about 0.5 to about 8, alternatively about 0.5 to about 5, phr elemental and/or polymeric sulfur and at least one sulfur vulcanization accelerator, provided, however, that the total of elemental and/or polymeric sulfur added to the rubber mixture, including the aforesaid sulfur added in a prior, preparatory mixing stage(s) is in a range of about 1.0 to about 8 phr.

In further accordance with this invention, the method comprises the additional step of vulcanizing the prepared rubber composition at a temperature in a range of about 135° C. to about 180° C.

A vulcanized rubber composition prepared thereby is also provided according to such method.

In additional accordance with this invention, the method comprises the additional steps of preparing an assembly of a tire of sulfur vulcanizable rubber with a tread of the said rubber composition and vulcanizing the assembly at a temperature in a range of about 135° C. to about 180° C.

A vulcanized tire prepared thereby is also provided according to such method.

The rubber composition is then cured, or vulcanized at an elevated temperature such as about 135° C. to about 180° C. Actually the rubber is usually shaped and cured in a suitable mold, generally under pressure, to form a rubber product.

Generally, in practice, the said individual rubber mixing steps are conducted in internal rubber mixers at the aforesaid temperatures with the rubber compositions being "batched off" at the end of each of such mixing steps onto an open mill composed of opposing rotating metal cylinders where the rubber composition is relatively mildly blended for a few minutes and the rubber removed therefrom in a form of a sheet which is usually allowed to cool to a temperature below 40° C. before the next internal mixing step.

The aforesaid recited cumulative mixing time is the mixing duration in the aforesaid internal mixer(s).

In further accordance with this invention, a rubber composition is similarly prepared where the preparatory steps (A) are composed of at least one sequential internal mixer mixing step, which (i) the said rubber, silica, silica coupler and elemental and/or polymeric sulfur are added in the same mixing step, or (ii) the rubber, silica and silica coupler are added in the same mixing step and the said sulfur is added in a subsequent non-productive preparatory mixing step.

Where it is desired that the rubber composition be primarily reinforced with silica as the reinforcing pigment, it is preferable that the weight ratio of silica to carbon black is at least 3/1, preferably at least 10/1 and preferably in a range of about 3/1 to about 30/1.

In further accordance with this invention, a rubber composition is provided having been prepared according to the method of this invention.

In additional accordance with this invention, a tire is provided having a tread of such composition.

The addition of sulfur in a preparatory step is considered herein to be particularly advantageous for the practice of this invention because it allows for a reduction in the amount of silica coupling agent which is considered to be beneficial to reducing the overall cost of the silica reinforced rubber composition.

In one aspect, such a rubber composition can be provided as being sulfur cured. The sulfur curing is accomplished in a conventional manner, namely, by curing under conditions of elevated temperature and pressure for a suitable period of time.

In the practice of this invention, as hereinbefore pointed out, the rubber composition is comprised of at least one diene-based elastomer, or rubber. Such rubbers may, for example, be of homopolymers and copolymers of conjugated dienes and copolymers of at least one conjugated diene and a vinyl aromatic compound. Representative dienes are, for example, isoprene and 1,3-butadiene and representative vinyl aromatic compounds are styrene and alphamethylstyrene. Thus, it is considered that the elastomer is a sulfur curable elastomer. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene/butadiene terpolymer rubbers, cis 1,4-polybutadiene rubber, medium vinyl polybutadiene rubber (30–50 percent vinyl) and high vinyl polybutadiene rubber (50–75 percent vinyl).

In one aspect, the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In another aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/ acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black if used, reinforcing filler(s) to contribute a reasonably high modulus and high resistance to tear. The combined weight of the silica and carbon black, as hereinbefore referenced, may be as low as about 30 parts per 100 parts rubber, but is preferably from about 45 to about 90 parts by weight.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, etc.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about one to about 3.5, sometimes from 1.5 to 3, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this example, sulfur is evaluated in combination with a silica coupling agent, namely, a bis-(3-triethoxysilylpropyl)tetrasulfide, in a silica reinforced rubber composition.

Rubber compositions containing the materials set forth in Tables 1 and 2 were prepared in a BR Banbury internal rubber mixer using three separate, sequential stages of mixing, namely, two sequential non-productive mix stages followed by productive mix stage to temperatures of 160° C., 160° C. and 120° C., respectively. The amount of coupling agent and sulfur which are added to the second non-productive stage are indicated in Table 1.

The addition of sulfur to the non-productive or "higher temperature" mixing stages is not a normal mixing procedure for rubber compounds containing carbon black and silica reinforcement. The addition of sulfur in the presence of silica and silica coupling agent is the inventive step of this invention.

The results as shown in Table 2 indicate that the addition of sulfur in place of the more expensive coupling agent provides cured rubber properties similar to the Control Sample B which utilizes the coupling agent in the non-productive mixing without the addition of elemental sulfur. All of the rubber compositions contain the coupling agent (Sample B) or coupling agent plus sulfur (Samples C and D) demonstrate properties such as modulus, hardness, rebound and abrasion which are superior to the Sample A which utilizes no coupling agent or sulfur in the non-productive mixing.

The Samples were cured at about 150° C. for about 36 minutes.

TABLE 1

| 1st Non-Productive | |
|---|---|
| NAT 2200 Rubber[1] | 100 |
| Carbon Black | 35 |
| Processing Oil | 5 |

TABLE 1-continued

| Zinc Oxide | 5 |
|---|---|
| Fatty Acid | 2 |
| Antioxidant[2] | 2 |
| 2nd Non-Productive | |
| Silica[3] | 15.00 |
| Bis-(3-triethoxysilylpropyl) tetrasulfide[4] | variable |
| Sulfur | variable |
| Productive | |
| Sulfur | 1.40 |
| Accelerator, sulfenamide type | 1.00 |

[1] synthetic cis 1,4-polyisoprene from The Goodyear Tire & Rubber Company;
[2] of the polymerized 1,2-dihydro-2,2,4-trimethyldihydroquinoline type;
[3] silica obtained as Hi-Sil 210 from PPG Industries, Inc.
[4] obtained as bis-(3-triethoxysilylpropyl) tetrasulfide, commercially available as X50S from Degussa GmbH which is provided in a 50/50 blend of Si69 with carbon black and, thus, considered as being 50% active when the blend is considered.

TABLE 2

| Sample # | A | B | C | D |
|---|---|---|---|---|
| Bis-(3-triethoxysilylpropyl) tetrasulfide (50% active) | 0 | 3.0 | 2.0 | 1.0 |
| Sulfur | 0 | 0 | .5 | 1.0 |
| Rheometer (150° C.) | | | | |
| Max. Torque | 31.2 | 35.3 | 38.0 | 39.0 |
| Min. Torque | 6.7 | 6.3 | 7.0 | 7.3 |
| Delta Torque | 24.5 | 29 | 31.0 | 31.7 |
| $T_{90}$, minutes | 21.8 | 18.0 | 16.3 | 15.0 |
| Stress-Strain | | | | |
| Tensile Strength, MPa | 16.2 | 18.4 | 16.3 | 17.1 |
| Elongation at Break, % | 605 | 552 | 493 | 516 |
| 100% Modulus, MPa | 12 | 1.9 | 2.0 | 2.0 |
| 300% Modulus, MPa | 5.6 | 8.7 | 9.0 | 8.7 |
| Rebound | | | | |
| 100° C., % | 58.9 | 63.1 | 64.4 | 65.5 |
| Room Temp (23° C.), % | 46.1 | 49.1 | 50.3 | 50.9 |
| Hardness | | | | |
| Shore A, 100° C. | 48.5 | 54.6 | 56.2 | 57.0 |
| Shore A, Room Temp (23° C.) | 51.3 | 56.8 | 58.1 | 58.8 |
| Rheovibron | | | | |
| E' at 60° C., MPa | 9.0 | 10.7 | 9.2 | 9.7 |
| Tan Delta at 60° C. | 0.107 | 0.095 | 0.087 | 0.089 |
| DIN Abrasion | 216 | 142 | 134 | 137 |

EXAMPLE II

In this Example, sulfur is evaluated in combination with a silica coupling agent or added by itself during the second non-productive mixing stage with silica. The mixing procedure was outlined in Example I.

The addition of sulfur alone in the non-productive mixing step (Sample G) gave only marginal improvements in laboratory properties for the rubber composition as compared to Sample E which contained no additive during the second non-productive mixing step. However, Sample H which utilized the conventional coupling agent but with the addition of sulfur in the second non-productive mixing step exhibits cured properties equal or improved when compared to Sample F which utilized only the coupling agent in the non-productive mixing.

The combination of coupling agent and elemental sulfur addition in the non-productive mixing in the presence of silica not only can provide a lower cost rubber composition by enabling the use of less of the coupling agent to achieve satisfactory rubber properties but also is observed to produce a synergistic effect as evidenced by the laboratory properties of the rubber compositions. In some cases, it is observed that the laboratory properties were better than the Control Sample F which utilized only the conventional silica coupler addition to the non-productive mixing without the sulfur addition.

TABLE 3

| 1st Non-Productive | |
| --- | --- |
| NAT 2200 Rubber[1] | 100 |
| Carbon Black | 35 |
| Processing Oil | 5 |
| Zinc Oxide | 5 |
| Fatty Acid | 2 |
| Antioxidant[2] | 2 |
| 2nd Non-Productive | |
| Silica[3] | 15.00 |
| Bis-(3-triethoxylsilylpropyl) tetrasulfide[4] | variable |
| Elemental sulfur | variable |
| Productive | |
| Elemental sulfur | 1.40 |
| Accelerator, sulfenamide type | 1.00 |

[1]synthetic cis 1,4-polyisoprene from The Goodyear Tire & Rubber Company;
[2]of the polymerized 1,2-dihydro-2,2,4-trimethyldihydroquinoline type;
[3]silica obtained as Hi-Sil 210 from PPG Industries, Inc.;
[4]obtained as bis-(3-triethoxysilylpropyl) tetrasulfide, commercially available as X50S from Degussa GmbH which is provided in a 50/50 blend of Si69 with carbon black and, thus, considered as being 50% active when the blend is considered.

TABLE 4

| Sample # | E | F | G | H |
| --- | --- | --- | --- | --- |
| Bis-(3-triethoxysilylpropyl) tetrasulfide (50% active) | 0 | 3.0 | 0 | 2.0 |
| Sulfur | 0 | 0 | 0.5 | 0.5 |
| Rheometer (150° C.) | | | | |
| Max. Torque | 28.8 | 32.0 | 31.0 | 34.3 |
| Min. Torque | 8.0 | 7.0 | 8.7 | 7.9 |
| Delta Torque | 20.8 | 25.0 | 22.3 | 26.4 |
| $T_{90}$, minutes | 21.0 | 18.8 | 18.3 | 17.8 |
| Stress-Strain | | | | |
| Tensile Strength, MPa | 17.2 | 20.6 | 18.6 | 21.4 |
| Elongation at Break, % | 655 | 615 | 646 | 610 |
| 100% Modulus, MPa | 1.1 | 1.7 | 1.2 | 1.8 |
| 300% Modulus, MPa | 4.9 | 8.1 | 5.6 | 8.5 |
| Rebound | | | | |
| 100° C., % | 56.7 | 61.1 | 60.5 | 64.0 |
| Room Temp (23° C.), % | 45.3 | 48.7 | 46.8 | 49.8 |
| Hardness | | | | |
| Shore A, 100° C. | 45.6 | 53.0 | 48.0 | 54.5 |
| Shore A, Room Temp (23° C.) | 48.6 | 56.2 | 51.2 | 57.3 |
| Rheovibron | | | | |
| E' at 60° C., MPa | 8.9 | 10.7 | 9.8 | 11.6 |
| Tan Delta at 60° C. | 0.109 | 0.096 | 0.104 | 0.090 |
| DIN Abrasion | 252 | 136 | 233 | 126 |

EXAMPLE III

In this Example, sulfur is evaluated in combination with a silica coupling agent in a highly silica loaded (reinforced) rubber composition in which 80 phr of silica is used. The addition of 0.8 phr of sulfur in the non-productive mixing in the presence of 12.8 phr or the coupler (actually 6.4 phr of coupler with or on 6.4 phr of carbon black) gave small improvements in rubber composition hardness, rebound and DIN abrasion rubber properties.

This Example shows that the addition of sulfur during the non-productive mixing step in the presence of silane coupling agent will allow a reduction of the level of coupling agent.

The non-productive mixing was for about 7 minutes to about 160° C. and the productive mixing was for about 2 minutes to about 120° C.

The samples were cured at about 150° C. for about 36 minutes.

TABLE 5

| 1st Non-Productive | |
| --- | --- |
| Natural polyisoprene rubber | 10 |
| BUD 1207 rubber[1] | 20 |
| Isoprene/butadiene rubber[2] | 45 |
| Emulsion SBR rubber[3] | 25 |
| Processing oil & wax | 28 |
| Fatty Acid | 3 |
| Silica[4] | 80 |
| Bis-(3-triethoxysilylpropyl) tetrasulfide[5] | 12.8 |
| Elemental sulfur | variable |
| Productive | |
| Elemental sulfur | 1.40 |
| Accelerator, sulfenamide type | 1.00 |
| Accelerator, diphenylguanidine | 2 |
| Antidegradants[6] | 3 |
| Zinc oxide | 2.5 |

[1]cis 1,4-polybutadiene from The Goodyear Tire & Rubber Company;
[2]copolymer rubber containing about 50 percent isoprene and having a Tg of about −45° C. from The Goodyear Tire & Rubber Company;
[3]styrene/butadiene copolymer prepared by emulsion polymerization containing about 40 percent styrene from The Goodyear Tire & Rubber Company;
[4]silica obtained as Zeosil MP 1165 from Rhone Poulenc;
[5]obtained as bis-(3-triethoxysilylpropyl) tetrasulfide, commercially available as X50S from Degussa GmbH which is provided in a 50/50 blend of Si69 with carbon black and, thus, considered as being 50% active when the blend is considered.
[6]amine type;

TABLE 6

| Sample # | I | J |
| --- | --- | --- |
| Bis-(3-triethoxysilylpropyl) tetrasulfide (50% active) | 12.8 | 12.8 |
| Sulfur | 0 | 0.8 |
| Rheometer (150° C.) | | |
| Max. Torque | 48.9 | 54.6 |
| Min. Torque | 15.0 | 18.2 |
| Delta Torque | 33.9 | 36.4 |
| $T_{90}$, minutes | 10.7 | 11.6 |
| Stress-Strain | | |
| Tensile Strength, MPa | 17.4 | 16.6 |
| Elongation at Break, % | 451 | 364 |
| 100% Modulus, MPa | 2.84 | 3.44 |
| 300% Modulus, MPa | 12.1 | 14.7 |
| Rebound | | |
| 100° C., % | 61.6 | 63.7 |
| Room Temp (23° C.), % | 36.7 | 38.2 |
| Hardness | | |
| Shore A, 100° C. | 68 | 70 |
| Shore A, Room Temp (23° C.) | 71 | 72 |

TABLE 6-continued

| Sample # | I | J |
|---|---|---|
| DIN Abrasion | 116 | 111 |

While certain representative embodiments and details have been shown for the purpose of illustrating the invention, it will be apparent to those skilled in this art that various changes and modifications may be made therein without departing from the spirit or scope of the invention.

What is claimed is:

1. A vulcanized tire prepared by preparing an assembly of a tire of sulfur vulcanizable rubber with a tread of rubber composition and vulcanizing the assembly at a temperature in a range of about 135° C. to about 180° C.; wherein said rubber composition for said tread is prepared in at least two sequential mixing steps which comprise:

(A) thermomechanically mixing in at least one individual preparatory mixing step at a temperature in a range of about 140° C. to about 190° C. for a total mixing time of about 4 to about 12 minutes;

(i) 100 parts by weight of at least one sulfur vulcanizable elastomer selected from conjugated diene homopolymers and copolymers and from copolymers of at least one conjugated diene and aromatic vinyl compound, (ii) about 30 to about 100 phr of particulate precipitated silica, (iii) about 0.01 to about 0.2 parts by weight per part by weight of said silica of bis-(3-triethoxysilylpropyl)polysulfide where the sulfide bridge portion contains 2 to 8 connecting sulfur atoms in which the average polysulfide bridge contains about 4.5 to about 5.5 sulfur atoms and in which at least 75 percent of the polysulfide bridge portion contains at least 3 sulfur atoms, and (iv) about 0.01 to about one part of at least one of elemental sulfur and polymeric sulfur by weight per part of silane coupling agent;

(B) subsequently blending therewith in a final, individual thermomechanical mixing step at a temperature in a range of about 100° C. to about 130° C. for a time of about 1 to about 3 minutes, about 0.5 to about 5 phr elemental and/or polymeric sulfur and at least one sulfur vulcanization accelerator, provided, however, that the total of sulfur added to the rubber mixture, including the aforesaid sulfur added in a preparatory mixing stage(s) is in a range of about 1.0 to about 8 phr.

* * * * *